United States Patent
Tachi

(10) Patent No.: US 10,431,356 B2
(45) Date of Patent: Oct. 1, 2019

(54) MOLDED PART-EQUIPPED ELECTRICAL CABLE AND MOLDED PART-EQUIPPED ELECTRICAL CABLE MANUFACTURING METHOD

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Kentaro Tachi, Yokkaichi (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 306 days.

(21) Appl. No.: 15/527,382

(22) PCT Filed: Nov. 13, 2015

(86) PCT No.: PCT/JP2015/081919
§ 371 (c)(1),
(2) Date: May 17, 2017

(87) PCT Pub. No.: WO2016/080289
PCT Pub. Date: May 26, 2016

(65) Prior Publication Data
US 2017/0323707 A1    Nov. 9, 2017

(30) Foreign Application Priority Data

Nov. 18, 2014 (JP) ................................. 2014-233641

(51) Int. Cl.
*H01R 43/24* (2006.01)
*H01B 17/58* (2006.01)
(Continued)

(52) U.S. Cl.
CPC ............... *H01B 17/58* (2013.01); *H01B 3/28* (2013.01); *H01B 17/60* (2013.01); *H01R 43/005* (2013.01);
(Continued)

(58) Field of Classification Search
CPC ........ H01B 17/58; H02G 1/145; H01R 43/24; H01R 43/005
(Continued)

(56) References Cited

U.S. PATENT DOCUMENTS

2010/0075535 A1* 3/2010 Mizutani ............. H01R 13/504
439/588
2012/0040571 A1* 2/2012 Yoshioka ............. H01R 13/504
439/736
(Continued)

FOREIGN PATENT DOCUMENTS

JP    58-132202    8/1983
JP    2002-315130    10/2002
(Continued)

OTHER PUBLICATIONS

International Search Report dated Feb. 16, 2016.

*Primary Examiner* — Sherman Ng
(74) *Attorney, Agent, or Firm* — Gerald E. Hespos; Michael J. Porco; Matthew T. Hespos

(57) ABSTRACT

It is aimed to suppress the peeling of an adhesive from an insulation coating of an insulated electrical cable due to resin shrink after the molding of a molded member. A molded part-equipped electrical cable includes a terminal-equipped electrical cable with an insulated electrical cable and a terminal, an adhesive provided on a surface of the insulation coating of the terminal-equipped electrical cable and a molded member covering from a part provided with the adhesive on the insulation coating of the terminal-
(Continued)

equipped electrical cable to a connected part of the insulated electrical cable and the terminal. The molded member includes a first molded part and a second molded part separately molded, and the first molded part includes a part covering the adhesive while being in contact with the adhesive.

7 Claims, 7 Drawing Sheets

(51) Int. Cl.
*H01B 3/28* (2006.01)
*H01B 17/60* (2006.01)
*H01R 43/00* (2006.01)
*H02G 1/14* (2006.01)
*H01R 11/12* (2006.01)
*H01R 13/52* (2006.01)

(52) U.S. Cl.
CPC ............. *H01R 43/24* (2013.01); *H02G 1/145* (2013.01); *H01R 11/12* (2013.01); *H01R 13/5216* (2013.01)

(58) Field of Classification Search
USPC ...................................................... 174/74 R
See application file for complete search history.

(56) References Cited

U.S. PATENT DOCUMENTS

2012/0149243 A1    6/2012  Ohnishi et al.
2014/0318862 A1*  10/2014  Tachi .................. H01R 43/005
                                                  174/75 R

FOREIGN PATENT DOCUMENTS

JP        2008-269858      11/2008
JP        2012-123999      6/2012

* cited by examiner

MOLDED PART-EQUIPPED ELECTRICAL CABLE AND MOLDED PART-EQUIPPED ELECTRICAL CABLE MANUFACTURING METHOD

BACKGROUND

1. Field of the Invention

The present invention relates to a molded part-equipped electrical cable including a terminal-equipped electrical cable and a molded member and a manufacturing method therefor.

2. Description of the Related Art

In a wiring harness to be installed in a vehicle such as an automotive vehicle, a terminal-equipped electrical cable includes an insulated electrical cable and a terminal connected to an end part of the insulated electrical cable. The insulated electrical cable includes a core and an insulation coating covering the periphery of the core.

Further, as described in Japanese Unexamined Patent Publication No. 2002-315130, a terminal-equipped electrical cable may include a molded member. The molded member covers an end part of an insulated electrical cable of the terminal-equipped electrical cable and a part of a terminal. The terminal-equipped electrical cable including the molded member is referred to as a molded part-equipped electrical cable below.

An adhesive may be provided on a surface of the insulation coating to improve an adhesive force between the molded member and the insulation coating of the insulated electrical cable, an adhesive may be provided on a surface of the insulation coating. However, the adhesive may be peeled off from the insulation coating due to resin shrink after the molding of the molded member. Particularly, in the case of employing an insulation coating having poor adhesion to the adhesive, the adhesive is easily peeled off from the insulation coating.

The present invention aims to suppress the peeling of an adhesive from an insulation coating of an insulated electrical cable due to resin shrink after the molding of a molded member in a molded part-equipped electrical cable.

SUMMARY

A molded part-equipped electrical cable according to a first aspect includes a terminal-equipped electrical cable including an insulated electrical cable having a core and an insulation coating covering the periphery of the core. A terminal is connected to an end part of the insulated electrical cable, and an adhesive provided on a surface of the insulation coating of the terminal-equipped electrical cable. A molded member covers from a part provided with the adhesive on the insulation coating of the terminal-equipped electrical cable to a connected part of the insulated electrical cable and the terminal. The molded member includes a first molded part and a second molded part separately molded, and the first molded part includes a part covering the adhesive while being in contact with the adhesive.

Normally, in a molded member provided on a terminal-equipped electrical cable, a thickness in the longitudinal direction is relatively large. However, in accordance with the subject disclosure, the second molded part may be present on the terminal side of the first molded part covering the adhesive in a longitudinal direction of the terminal-equipped electrical cable. Thus, molding can be performed with a thickness of the first molded part in the longitudinal direction reduced. Therefore, stress that can cause peeling of the adhesive due to resin shrink during the molding of the first molded part can be reduced and the peeling of the adhesive from the insulation coating can be suppressed.

The second molded part may be present outside the part of the first molded part covering the adhesive in a radial direction of the terminal-equipped electrical cable. In this case, the molded member can be molded separately in the radial direction of the terminal-equipped electrical cable. Thus, molding can be performed with a thickness of the first molded part in the radial direction reduced. Therefore, stress that can cause peeling of the adhesive due to resin shrink during the molding of the first molded part can be reduced and the peeling of the adhesive from the insulation coating can be suppressed.

The insulation coating may be made of silicone rubber. Normally, an insulation coating made of silicone rubber has poor adhesion to the adhesive. However, the molded part-equipped electrical cable with the molded member including the first and second molded parts is more effective.

The first and second molded parts may be formed of the same molding resin, thereby reducing manufacturing costs.

The invention also relates to a molded part-equipped electrical cable manufacturing method for manufacturing the above-described molded part-equipped electrical cable. The method includes (a) forming the first molded part to cover the adhesive of the terminal-equipped electrical cable while being in contact with the adhesive, and (b) forming the second molded part at a position contacting the first molded part. The step (b) may be performed at a time different from the step (a). The first and second molded parts form the molded member covering from the part provided with the adhesive on the insulation coating of the terminal-equipped electrical cable to the connected part of the insulated electrical cable and the terminal. In this case, it is possible to easily manufacture the molded part-equipped electrical cable capable of suppressing the peeling of the adhesive from the insulation coating of the insulated electrical cable due to resin shrink after the molding of the molded member.

DETAILED DESCRIPTION

Figure 1:
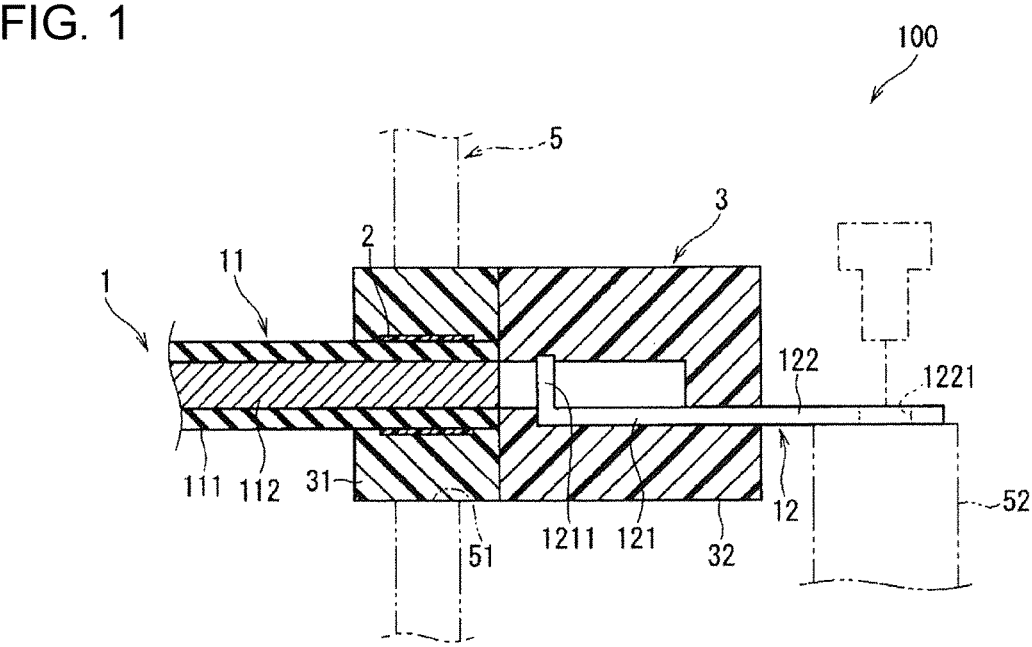
FIG. 1 is a side view partly in section of a molded part-equipped electrical cable according to a first embodiment.

Hereinafter, embodiments of the present invention are described with reference to the accompanying drawings. The following embodiments are specific examples of the present invention and not intended to limit the technical scope of the present invention.

First Embodiment

A molded part-equipped electrical cable 100 according to a first embodiment is described with reference to FIGS. 1 to 5. The molded part-equipped electrical cable 100 includes a terminal-equipped electrical cable 1, an adhesive 2 and a molded member 3. The terminal-equipped electrical cable 1 includes an insulated electrical cable 11 and a terminal 12.

Figure 2:
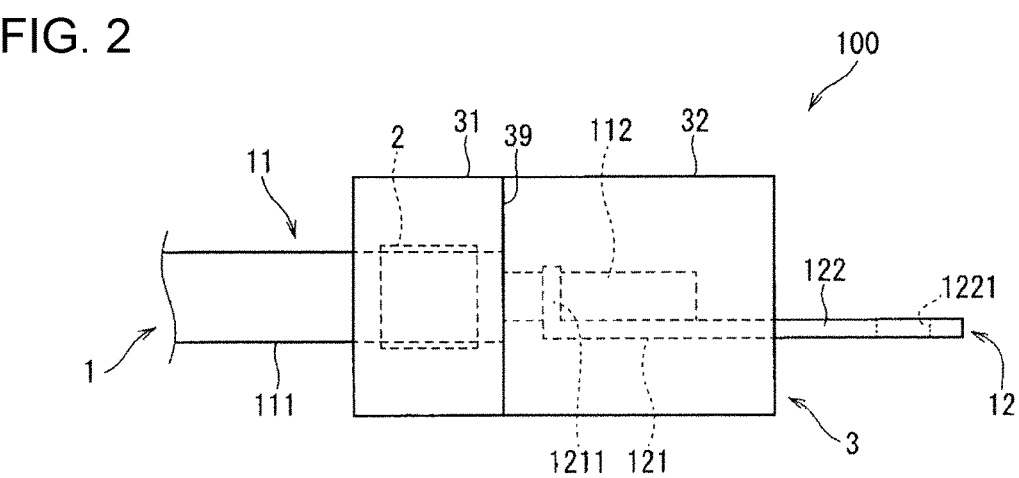
FIG. 2 is a side view of the molded part-equipped electrical cable according to the first embodiment.

FIG. 1 is a side view partly in section of the molded part-equipped electrical cable 100. In FIG. 1, the inside of the molded member 3 and the inside of a part of the insulated electrical cable 11 are shown in section. FIG. 2 is a side view of the molded part-equipped electrical cable 100.

The molded part-equipped electrical cable 100 constitutes a part of a wiring harness to be installed in a vehicle such as an automotive vehicle. In this embodiment, the molded part-equipped electrical cable 100 is thought to be inserted into an opening 51 of a casing 5 such as a shield shell and connected to a mating member 52 such as a terminal block provided in the casing 5. At this time, the molded member 3 of the molded part-equipped electrical cable 100 is fit into the opening 51 of the casing 5, whereby the molded part-equipped electrical cable 100 is positioned. Note that the casing 5, the opening 51 and the mating member 52 are shown by imaginary lines (chain double-dashed lines) in FIG. 1.

<Molded Part-Equipped Electrical Cable: Terminal-Equipped Electrical Cable>

In the molded part-equipped electrical cable 100, the terminal-equipped electrical cable 1 includes the insulated electrical cable 11 and the terminal 12. The insulated electrical cable 11 includes a core 112 and an insulation coating 111 covering the periphery of the core 112. The core 112 is, for example, a member mainly containing metal such as copper or aluminum. The insulation coating 111 is an insulating resin member.

In this embodiment, the insulation coating 111 is formed of silicone rubber. Silicon rubber is generally known to be a hardly adhesive material. Note that the insulation coating 111 may be formed of a hardly adhesive material such as fluororesin besides silicone rubber. Further, the insulation coating 111 may be, for example, a synthetic resin member mainly containing polyethylene or vinyl chloride.

The terminal 12 is connected to an end part of the insulated electrical cable 11. In this embodiment, the terminal 12 includes an electrical cable connecting portion 121 and a mating member connecting portion 122. The terminal 12 is, for example, a member mainly containing metal such as copper.

In this embodiment, the electrical cable connecting portion 121 is a part to be connected to the core 112 of the insulated electrical cable 11. The electrical cable connecting portion 121 is connected to the core 112 extending out from the insulation coating 111. Further, in this embodiment, the electrical cable connecting portion 121 includes a crimping piece 1211 crimped to the core 112 extending out from the insulation coating 111 of the insulated electrical cable 11. Note that the electrical cable connecting portion 121 may further include a crimping piece for the insulation coating 111 to be connected to the insulation coating 111 on an end part of the insulated electrical cable 11. Further, the core 112 of the insulated electrical cable 11 may be connected to the electrical cable connecting portion 121 of the terminal 12 by welding such as heat welding or ultrasonic welding.

Further, in this embodiment, the mating member connecting portion 122 is a part connectable to the mating member 52. In this embodiment, the mating member connecting portion 122 is formed with a hole 1221 enabling the mating member connecting portion 122 to be fastened to the mating member 52 (terminal block) by a bolt.

<Molded Part-Equipped Electrical Cable: Adhesive>

In the molded part-equipped electrical cable 100, the adhesive 2 is provided on a surface of the insulation coating 111 of the insulated electrical cable 11. In this embodiment, the adhesive 2 is provided along a circumferential direction of the insulated electrical cable 11 on the outer peripheral surface of the insulation coating 111 as shown in FIGS. 1 and 2. Further, the adhesive 2 is provided on an end part of the insulation coating 111. Considering a waterproof structure of the molded part-equipped electrical cable 100, the adhesive 2 is preferably provided over the entire circumference of the outer peripheral surface of the insulation coating 111 as shown in FIGS. 1 and 2. Note that the adhesive 2 may be partially provided in the circumferential direction of the insulation coating 111, e.g. provided in a spot-like manner along the circumferential direction of the insulation coating 111.

The adhesive 2 is, for example, formed of a resin material such as a silicone-based resin material. The adhesive 2 adheres to the insulation coating 111 to fill up a clearance between the molded member 3 to be described later and the insulation coating 111 and form the waterproof structure of the molded part-equipped electrical cable 100. Since silicone rubber is used as the insulation coating 111 in this embodiment, adhesion between the molded member 3 and the insulation coating 111 is poor. Thus, the adhesive 2 is employed to further improve the performance of the waterproof structure of the molded part-equipped electrical cable 100. Specifically, it is thought to employ a resin material better in adhesion to the resin material (silicone rubber in this embodiment) of the insulation coating 111 than molding resin for the molded member 3 to be described later as the resin material for the adhesive 2.

<Molded Part-Equipped Electrical Cable: Molded Part>

In the molded part-equipped electrical cable 100, the molded member 3 includes a first molded part 31 and a second molded part 32 which are separately molded. In this embodiment, the second molded part 32 is provided on the terminal 12 side of the first molded part 31 covering the adhesive 2 while being in contact with the adhesive 2 in a longitudinal direction of the terminal-equipped electrical cable 1 (insulated electrical cable 11). Specifically, in this embodiment, the first and second molded parts 31, 32 are separately formed in the longitudinal direction of the insulated electrical cable 11.

The molded member 3 covers from a part provided with the adhesive 2 on the insulation coating 111 of the terminal-equipped electrical cable 1 to a connected part of the insulated electrical cable 11 and the terminal 12. Specifically, the molded member 3 covers the connected part of the insulated electrical cable 11 and the terminal 12 and constitutes the waterproof structure of the molded part-equipped electrical cable 100.

The resin (molding resin) for forming the molded member 3 is thought to be PPS (polyphenylene sulfide) resin, PPA (polyphthalamide) resin, LCP (liquid crystal polymer) resin, phenol-based, polyester-based, polyamide-based or epoxy-based resin, PBT (polybutylene terephthalate) resin or the like.

Further, in this embodiment, the first and second molded parts 31, 32 are formed of the same molding resin. Thus, the molded member 3 is formed of one type of molding resin. Note that the first and second molded parts 31, 32 may be formed of different molding resins. In this case, the molded member 3 includes two molded parts respectively formed of different types of molding resins.

Further, the molded member 3 is thought to have a contour shape fittable into the opening 51. Note that, depending on the shape of the opening 51 of the casing 5, a projection or recess fittable to the opening 51 may be formed on the outer peripheral surface of the molded member 3. Note that a part to be fit into the opening 51 is thought to be the first molded part 31 of the molded member 3, the second molded part 32 or a part extending from the first molded part 31 to the second molded part 32. Further, in this embodiment, the first and second molded parts 31, 32 are formed to have the same contour shape. Specifically, no step is formed between the outer peripheral surface of the first molded part 31 and that of the second molded part 32. However, the contour shape of the first molded part 31 and that of the second molded part 32 may be possibly different.

Further, in this embodiment, the molded member 3 includes the first molded part 31 including a part covering the adhesive 2 and formed on the end part of the insulation coating 111 and the second molded part 32 including a part covering the connected part of the insulated electrical cable 11 and the terminal 12 and formed to cover the entire core 11 extending out from the insulation coating 111. Specifically, in this embodiment, the first molded part 31 is formed from an end of the insulation coating 111 toward a part between both ends of the insulated electrical cable 11 (hereinafter, an intermediate part) in the longitudinal direction of the insulated electrical cable 11 to include an area provided with the adhesive 2. Further, the second molded part 32 is formed from the end of the insulation coating 111 toward the terminal 12 side (side opposite to the intermediate part side) in the longitudinal direction of the insulated electrical cable 11 to include a connected part of the core 112 of the insulated electrical cable 11 and the terminal 12.

The first molded part 31 includes the part covering the adhesive 2 while being in contact with the adhesive 2. Thus, the first molded part 31 is thought to be formed into an annular shape covering the periphery of the adhesive 2.

Further, in this embodiment, the first molded part 31 is provided to cover the entire adhesive 2. However, the first molded part 31 may possibly cover only a part of the adhesive 2 in the longitudinal direction of the insulated electrical cable 11. In this case, a part of the adhesive 2 not covered by the first molded part 31 is thought to be exposed in the molded part-equipped electrical cable 100. Specifically, in this case, the part of the adhesive 2 is thought to be exposed without being covered.

The second molded part 32 constitutes the molded member 3 together with first molded part 31. Since the molded member 3 is composed of two molded parts (first and second molded parts 31, 32) in this embodiment, the second molded part 32 is a part of the molded member 3 other than the first molded part 31.

In the molded part-equipped electrical cable 100, the second molded part 32 can be also said to be a part provided out of contact with the adhesive 2 provided on the insulation coating 111 of the insulated electrical cable 11. For example, as shown in FIGS. 1 and 2, the second molded part 32 is thought to include only the part covering the connected part of the terminal 12 and the insulated electrical cable 11.

In this embodiment, the second molded part 32 covers the core 112 extending out from the insulation coating 111 and the electrical cable connecting portion 121 of the terminal 12. The second molded part 32 is, for example, formed into an annular shape covering the core 112 extending out from the insulation coating 111 and the electrical cable connecting portion 121 of the terminal 12. Note that, in this embodiment, the second molded part 32 is formed to have the same contour shape as the first molded part 31.

In this embodiment, the first molded part 31 covering the part of the insulation coating 111 provided with the adhesive 2 includes no part covering the terminal 12 and the second molded part 32 includes no part covering the insulation coating 111 as described above. Thus, in this embodiment, the first molded part 31 includes no annular part covering the peripheries of the core 112 extending out from the insulation coating 111 and the electrical cable connecting portion 121 of the terminal 12 and the second molded part 32 includes no annular part covering the periphery of the insulation coating 111. However, the second molded part 32 may also possibly include the part covering the periphery of the insulation coating 111. Further, the first molded part 31 may possibly include the part covering the periphery of the core 112 extending out from the insulation coating 111 or the part covering the periphery of the terminal 12.

Further, the first and second molded parts 31, 32 are separately molded. Thus, the molded member 3 may be possibly formed with a boundary surface 39 indicating a boundary between the first and second molded parts 31, 32. Since the first and second molded parts 31, 32 are arranged side by side in the longitudinal direction of the insulated electrical cable 11 in this embodiment, the boundary surface 39 is a surface perpendicular to the longitudinal direction of the insulated electrical cable 11. Further, when the molded part-equipped electrical cable 100 is viewed from outside, the molded member 3 may be possibly formed with a boundary line extending along the circumferential direction of the insulated electrical cable 11 by the boundary surface 39.

<Molded Part-Equipped Electrical Cable Manufacturing Method>

Next, an example of the manufacturing method for the molded part-equipped electrical cable 100 of this embodiment is described. The molded part-equipped electrical cable manufacturing method of this embodiment includes a first molded part forming step and a second molded part forming step. The first molded part forming step is a step of forming the first molded part 31 to cover the adhesive 2 on the terminal-equipped electrical cable 1 while being in contact with the adhesive 2. The second molded part forming step is performed at a time different from the first molded part forming step to form the second molded part 32 at a position contacting the first molded part 31. Note that the molded part-equipped electrical cable manufacturing method of this embodiment further includes an adhesive applying step. The adhesive applying step is a step of providing the adhesive 2 on the insulation coating 111 of the insulated electrical cable 11 of the terminal-equipped electrical cable 1.

Figure 3:
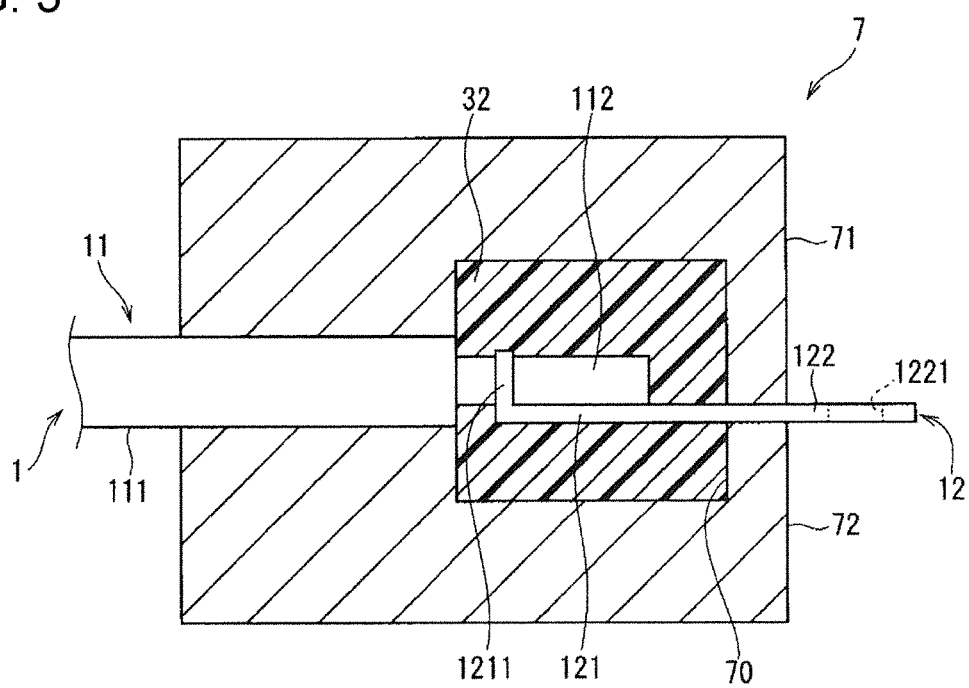
FIG. 3 is a view showing a part of a molded part-equipped electrical cable manufacturing method according to the first embodiment.
Figure 4:
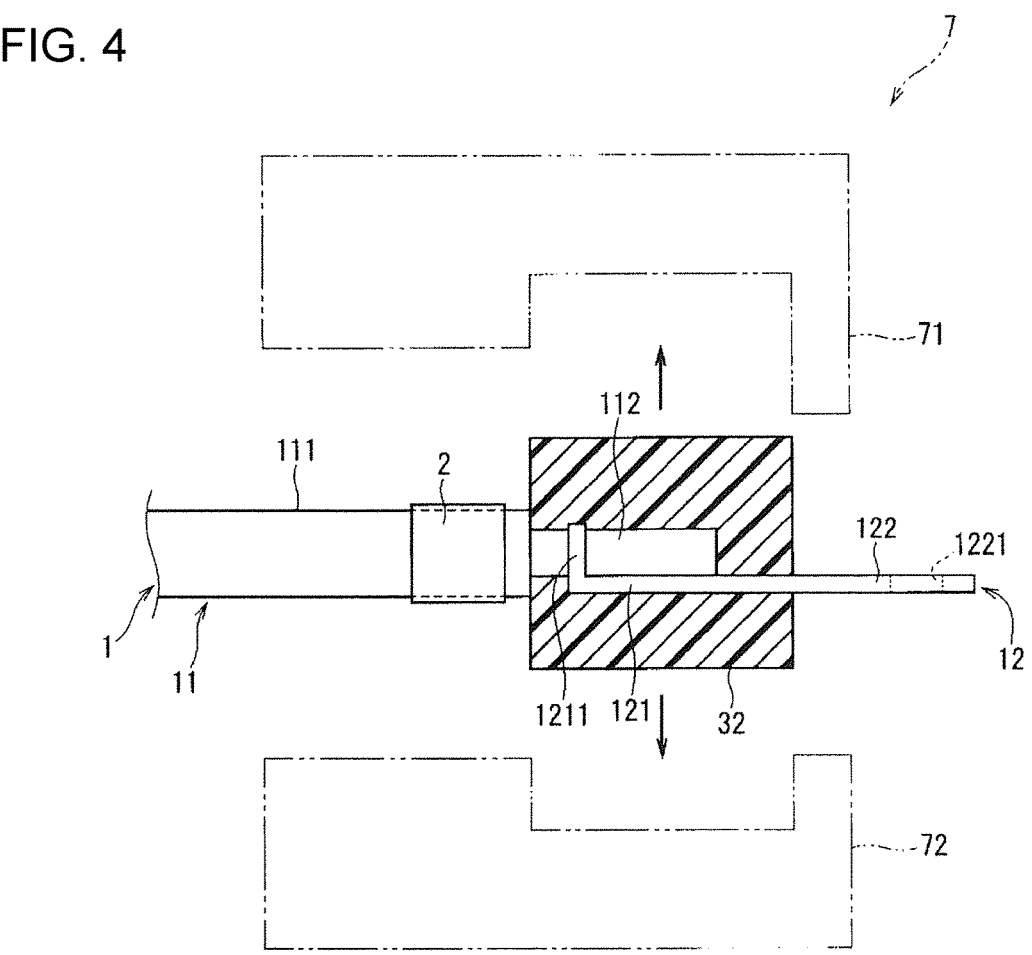
FIG. 4 is a view showing a part of the molded part-equipped electrical cable manufacturing method according to the first embodiment.
Figure 5:
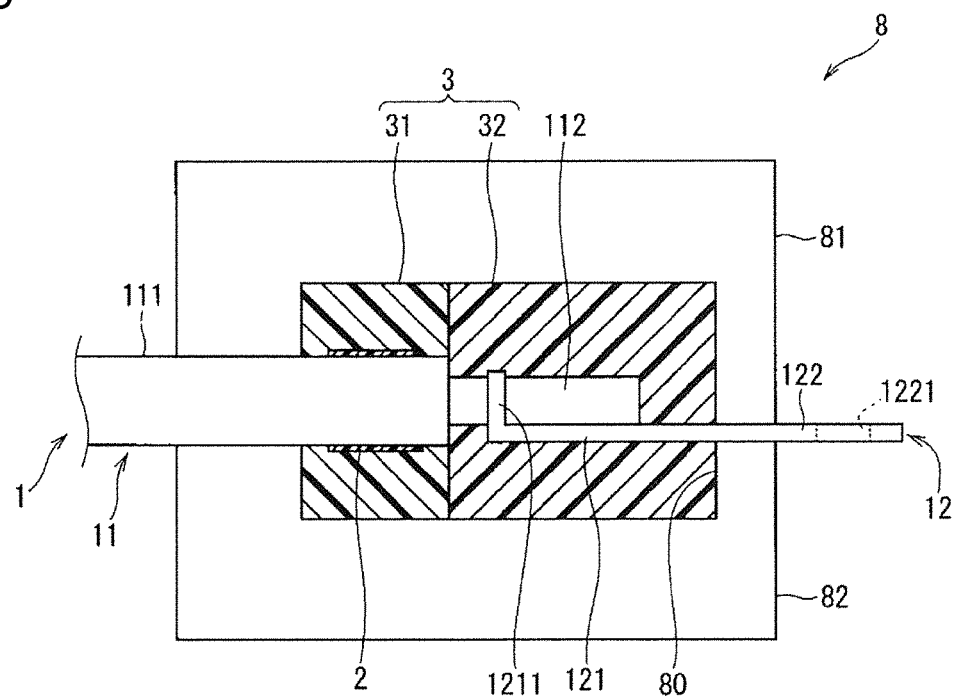
FIG. 5 is a view showing a part of the molded part-equipped electrical cable manufacturing method according to the first embodiment.

First, a mold 7 and a mold 8 used in the molded part-equipped electrical cable manufacturing method of this embodiment are described. Note that FIG. 3 is a view showing the second molded part forming step of the molded part-equipped electrical cable manufacturing method of this embodiment. FIG. 4 is a view showing the adhesive applying step of the molded part-equipped electrical cable manufacturing method of this embodiment. FIG. 5 is a view showing the first molded part forming step of the molded part-equipped electrical cable manufacturing method of this embodiment.

In the molded part-equipped electrical cable manufacturing method of this embodiment, the mold 7 is used in the second molded part forming step. As shown in FIG. 3, the mold 7 includes an upper mold 71 and a lower mold 72. The upper and lower molds 71, 72 are movable away from and toward each other. Further, in a state where the upper and lower molds 71, 72 are closest to each other, the mold 7 is formed with a molding space 70. The molding space 70 is a space enclosed by molding surfaces having the same contour shape as the one formed by the outer peripheral surface of the second molded part 32.

In the molded part-equipped electrical cable manufacturing method of this embodiment, the mold 8 is used in the first molded part forming step. As shown in FIG. 5, the mold 8 includes an upper mold 81 and a lower mold 82. The upper and lower molds 81, 82 are movable away from and toward each other. Further, in a state where the upper and lower molds 81, 82 are closest to each other, the mold 8 is formed with a molding space 80. The molding space 80 is a space enclosed by molding surfaces having the same contour shape as the one formed by the outer peripheral surface of the molded member 3 including the first and second molded parts 31, 32.

In the molded part-equipped electrical cable manufacturing method of this embodiment, the second molded part forming step, the adhesive applying step and the first molded part forming step are performed in this order. Each step of the molded part-equipped electrical cable manufacturing method is described in this order below. Further, before the start of the second molded part forming step, a terminal-equipped electrical cable manufacturing step is performed to manufacture the terminal-equipped electrical cable 1 by connecting the insulated electrical cable 11 and the terminal 12. Note that, in this embodiment, the terminal-equipped electrical cable manufacturing step is a crimping step of crimping the terminal 12 to the core 112 of the insulated electrical cable 11.

<Second Molded Part Forming Step>

In this embodiment, the second molded part forming step is first performed. The second molded part forming step is a step performed at a time different from the first molded part forming step to form the second molded part 32 at the position contacting the first molded part 31.

For example, the terminal-equipped electrical cable 1 is disposed at a predetermined position of the lower mold 72 of the mold 7 and the upper mold 71 is brought closer to the lower mold 72. In the state where the upper and lower molds 71, 72 are closest to each other, a part of the terminal-equipped electrical cable 1 planned to form the second molded part 32 is accommodated in the molding space 70.

Since the second molded part 32 is formed to cover the core 112 extending out from the insulation coating 111 of the insulated electrical cable 11 of the terminal-equipped electrical cable 1 and the electrical cable connecting portion 121 of the terminal 12 in this embodiment, the core 112 extending out from the insulation coating 111 and the electrical cable connecting portion 121 of the terminal 12 are accommodated in the molding space 70 of the mold 7. Further, by the above description, that the terminal-equipped electrical cable 1 is disposed at the predetermined position of the lower mold 72 of the mold 7 means that the core 112 extending out from the insulation coating 111 in the insulated electrical cable 11 and the electrical cable connecting portion 121 of the terminal 12 are positioned and disposed in a part of the lower mold 72 planned to form the molding space 70.

With the core 112 extending out from the insulation coating 111 and the electrical cable connecting portion 121 of the terminal 12 accommodated in the molding space 70 of the mold 7, molding resin for the second molded part 32 is injected into the molding space 70. When the molding resin is cured to form the second molded part 32, the terminal-equipped electrical cable 1 accompanied with the second molded part 32 is taken out from the mold 7.

Note that, in this embodiment, the second molded part 32 is formed earlier than the first molded part 31. Thus, the part planned to form the second molded part 32 is provided at the position contacting the first molded part 31. Specifically, since the second molded part 32 is formed earlier in this embodiment, the second molded part 32 is provided in contact with the part planned to form the first molded part 31.

<Adhesive Applying Step>

In this embodiment, the adhesive applying step of applying the adhesive 2 to the terminal-equipped electrical cable 1 accompanied with the second molded part 32 and taken out from the mold 7 is performed after the second molded part forming step. As shown in FIG. 4, the adhesive 2 is applied over the entire circumference of the insulation coating 111 along the circumferential direction of the insulated electrical cable 11 in this embodiment. In this way, the terminal-equipped electrical cable 1 accompanied with the second molded part 32 and the adhesive 2 can be obtained.

<First Molded Part Forming Step>

In this embodiment, the first molded part forming step is performed after the adhesive applying step. More specifically, after the adhesive applying step and after the molding resin for the second molded part 32 supplied in the second molded part forming step is cured to form the second molded part 32, the first molded part forming step is performed. The first molded part forming step is a step of forming the first molded part 31 to cover the adhesive 2 on the terminal-equipped electrical cable 1 while being in contact with the adhesive 2.

For example, the terminal-equipped electrical cable 1 accompanied with the second molded part 32 and the adhesive 2 is disposed at a predetermined position of the lower mold 82 of the mold 8 and the upper mold 81 is brought closer to the lower mold 82. In the state where the upper and lower molds 81, 82 are closest to each other, a part planned to form the first molded part 31 on the terminal-equipped electrical cable 1 and the second molded part 32 are accommodated in the molding space 80.

In this embodiment, the first molded part 31 covers the part of the insulation coating 111 provided with the adhesive 2. Thus, besides the second molded part 32, the end part of the insulation coating 111, more specifically, the part of the insulation coating 111 provided with the adhesive 2 is accommodated in the molding space 80. Further, by the above description, that the terminal-equipped electrical cable 1 accompanied with the second molded part 32 and the adhesive 2 is disposed at the predetermined position of the lower mold 82 of the mold 8 means that the part of the insulation coating 111 provided with the adhesive 2 in the terminal-equipped electrical cable 1 and the second molded part 32 are positioned and disposed in a part of the lower mold 82 planned to form the molding space 80.

With the part of the terminal-equipped electrical cable 1 planned to form the first molded part 31 accommodated in the molding space 80 of the mold 8, molding resin for the first molded part 31 is injected into the molding space 80. More specifically, the molding resin for the first molded part 31 is injected into a space not taken up by the second molded part 32 in the molding space 80. Note that the same resin as the molding resin for the second molded part 32 is used as the molding resin for the first molded part 31.

The molding resin for the first molded part 31 is cured in the molding space 80 to form the first molded part 31. The first molded part 31 is formed by curing the molding resin for the first molded part 31 in contact with the rear end surface of the second molded part 32 already cured and formed. Note that the rear end surface of the second molded part 32 is an end surface of the second molded part 32 on the insulation coating 111 side and is a part of a surface forming the space, into which the molding resin for the first molded part 31 is injected, in the molding space 80. Thus, in this embodiment, the first molded part 31 is formed adjacent to the second molded part 32 in the longitudinal direction of the insulated electrical cable 11.

After the molding resin for the first molded part 31 is cured to form the first molded part 31, the terminal-equipped electrical cable 1 with the first and second molded parts 31, 32 is taken out from the mold 8. At this time, stress for peeling the adhesive 2 from the insulation coating 111 due to resin shrink is generated on the adhesive 2 provided on the surface of the insulation coating 111.

However, in this embodiment, the second molded part 32 is formed before the first molded part 31 in contact with the adhesive 2 is formed. Thus, the second molded part 32 is less likely to exert stress for peeling the adhesive 2 from the insulation coating 111.

Thus, in this embodiment, the molding resin during the molding of the first molded part 31 mainly exerts stress for peeling the adhesive 2 from the insulation coating 111. Specifically, as compared to the case where a molded member having the same size as the molded member 3 including the first and second molded parts 31, 32 is provided on the terminal-equipped electrical cable 1 by one molding, a thickness in the longitudinal direction of the insulated electrical cable 11 can be reduced by a thickness of the second molded part 32 in the longitudinal direction. Thus, stress for peeling the adhesive 2 from the insulation coating 111 can be reduced and, eventually, it can be suppressed to form a clearance between the first molded part 31 and the insulation coating 111 of the insulated electrical cable 11. In this way, the performance of the waterproof structure of the molded part-equipped electrical cable 100 can be improved. Note that it may be also possible to perform the first molded part forming step earlier than the second molded part forming step.

<Molded Part-Equipped Electrical Cable>

The molded part-equipped electrical cable 100 is obtained by taking out the terminal-equipped electrical cable 1 accompanied with the first and second molded parts 31, 32 from the mold 8. In the molded part-equipped electrical cable 100, the boundary surface 39 indicating the boundary between the first and second molded parts 31, 32 may be possibly formed on the molded member 3.

In this embodiment, the first and second molded parts 31, 32 of the molded member 3 are separately molded. This is because stress causing the peeling of the adhesive 2 due to resin shrink increases as the thickness of the formed molded member 3 increases or the amount of the molding resin increases. Specifically, in this embodiment, stress causing the peeling of the adhesive 2 due to resin shrink during the molding of the first molded part 31 can be reduced by separately molding the first and second molded parts 31, 32. As a result, the peeling of the adhesive 2 from the insulation coating 111 of the insulated electrical cable 11 due to resin shrink after the molding of the molded member 3 can be suppressed in the molded part-equipped electrical cable 100.

Further, in this embodiment, the second molded part 32 is present on the terminal 12 side of the first molded part 31 covering the adhesive 2 in the longitudinal direction of the insulated electrical cable 11. In this case, the molded member 3 can be molded separately in the longitudinal direction of the insulated electrical cable 11. Thus, molding can be performed with the thickness of the first molded part 31 in the longitudinal direction of the insulated electrical cable 11 reduced. Normally, in a molded member provided on a terminal-equipped electrical cable, a thickness in a longitudinal direction of an insulated electrical cable is relatively large in many cases. Thus, in this embodiment, stress causing the peeling of the adhesive 2 due to resin shrink during the molding of the first molded part 31 can be more reduced and the peeling of the adhesive 2 from the insulation coating 111 can be suppressed.

Further, in this embodiment, the insulation coating 111 is made of silicone rubber. Normally, the insulation coating 111 made of silicone rubber is poor in adhesion to the adhesive 2. Thus, the waterproof structure of the molded part-equipped electrical cable 100 of this embodiment is more effective.

Further, since the first and second molded parts 31, 32 are formed of the same molding resin in this embodiment, manufacturing cost can be suppressed. Further, the first and second molded parts 31, 32 may be also possibly colored with the same color. Further, the same molding resins having different original colors may be possibly used for the first and second molded parts 31, 32.

Second Embodiment

Figure 6:
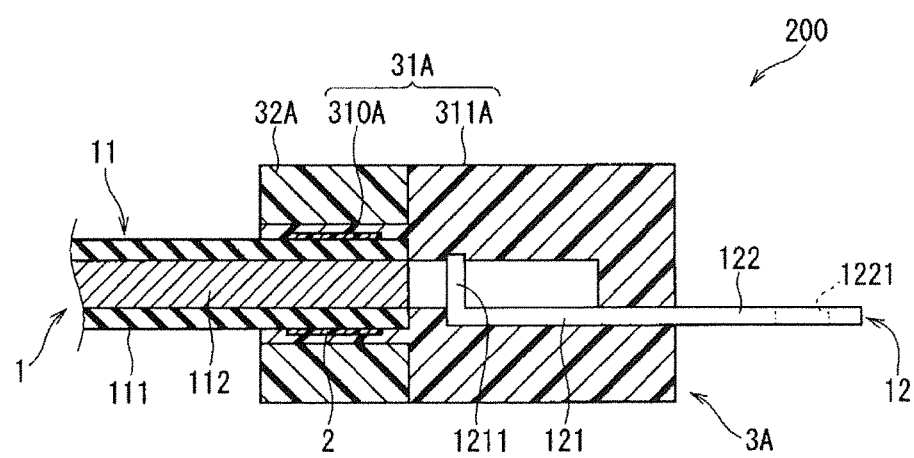
FIG. 6 is a side view partly in section of a molded part-equipped electrical cable according to a second embodiment.
Figure 7:
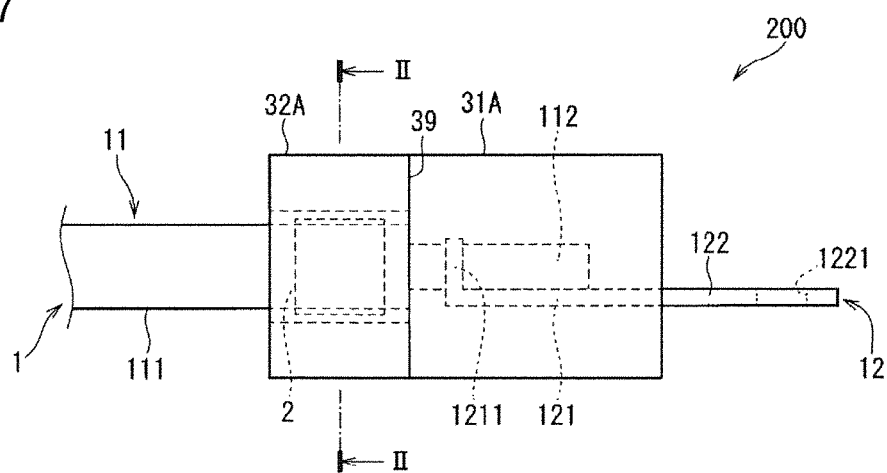
FIG. 7 is a side view of the molded part-equipped electrical cable according to the second embodiment.
Figure 8:
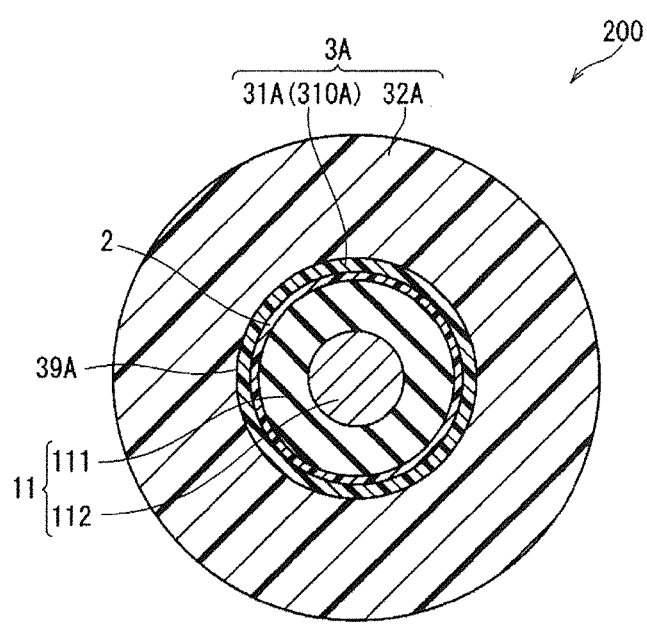
FIG. 8 is a section of the molded part-equipped electrical cable according to the second embodiment.

Next, a molded part-equipped electrical cable 200 according to a second embodiment is described with reference to FIGS. 6 to 11. The molded part-equipped electrical cable 200 includes a molded member 3A structured differently from the molded member 3 of the molded part-equipped electrical cable 100. The molded member 3A includes a first molded part 31A and a second molded part 32A. FIG. 6 is a side view partly in section of the molded part-equipped electrical cable 200. FIG. 7 is a side view of the molded part-equipped electrical cable 200. FIG. 8 is a section of the molded part-equipped electrical cable 200. FIG. 8 is a section along plane II-II of FIG. 7. Note that, in FIGS. 6 to 8, the same constituent elements as those shown in FIGS. 1 to 5 are denoted by the same reference signs.

This embodiment differs from the first embodiment in that the second molded part 32A is present outside a part of the first molded part 31A covering an adhesive 2 in a radial direction of a terminal-equipped electrical cable 1 (insulated electrical cable 11). Points of difference of this embodiment from the first embodiment are described below.

In this embodiment, the first molded part 31A of the molded member 3A includes a part covering the adhesive 2 while being in contact with the adhesive 2 and a part covering a connected part of an insulated electrical cable 11 and a terminal 12. Note that, as shown in FIGS. 6 and 7, a thickness of the part of the first molded part 31A covering the adhesive 2 in the radial direction of the insulated electrical cable 11 is smaller than that of the part of the first molded part 31A covering the connected part of the insulated electrical cable 11 and the terminal 12 in the radial direction. Specifically, the first molded part 31A is shaped such that a thin annular part and a thick annular part are adjacent and connected such that axial center directions thereof are aligned. If necessary, the part of the first molded part 31A covering the adhesive 2 is referred to as a thin portion 310A and the part of the first molded part 31A covering the connected part of the insulated electrical cable 11 and the terminal 12 is referred to as a thick portion 311A below.

The thin portion 310A is formed into an annular shape covering the periphery of the adhesive 2. A thickness of the thin portion 310A is thought to be, for example, 1 mm to 2 mm.

The thick portion 311A is formed into an annular shape covering the periphery of the connected part of the insulated electrical cable 11 and the terminal 12. More specifically, the thick portion 311A is an annular part covering the peripheries of a core 112 extending out from an insulation coating 111 and an electrical cable connecting portion 121 of the terminal 12.

As shown in FIG. 8, the second molded part 32A is provided outside the part of the first molded part 31A covering the adhesive 2 (thin portion 310A) in the radial direction of the insulated electrical cable 11. Specifically, the second molded part 32A is formed into an annular shape covering the periphery of the thin portion 310A. The second molded part 32A is provided on an intermediate side of the insulated electrical cable 11 rather than on an end of the insulation coating 111 in the longitudinal direction of the insulated electrical cable 11. Note that, in this embodiment, a contour shape formed by the outer peripheral surface of the second molded part 32A has the same size as that formed by the outer peripheral surface of the thick portion 311A.

Further, also in this embodiment, a boundary surface indicating a boundary between the first and second molded parts 31A, 32A may be possibly formed on the molded member 3A as in the first embodiment. In this embodiment, the molded member 3A may be possibly formed with a boundary surface 39 perpendicular to the longitudinal direction of the insulated electrical cable 11 and a boundary surface 39A formed on a rear end side of the molded member 3A and extending along the contour of the thin portion 310A of the first molded part 31A.

<Molded Part-Equipped Electrical Cable Manufacturing Method>

Next, an example of the manufacturing method for the molded part-equipped electrical cable 200 of this embodiment is described. The molded part-equipped electrical cable manufacturing method of this embodiment includes a first molded part forming step and a second molded part forming step and further includes an adhesive applying step as in the first embodiment.

Figure 9:
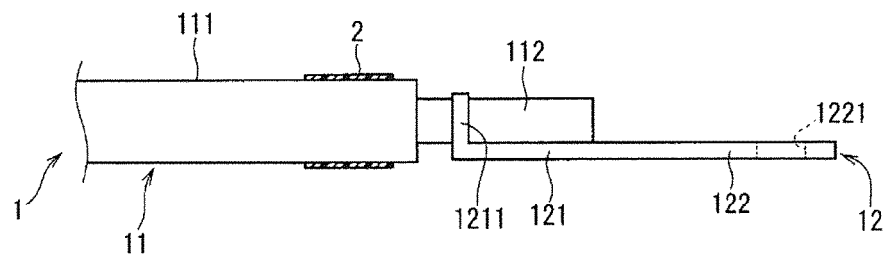
FIG. 9 is a view showing a part of a molded part-equipped electrical cable manufacturing method according to the second embodiment.
Figure 10:
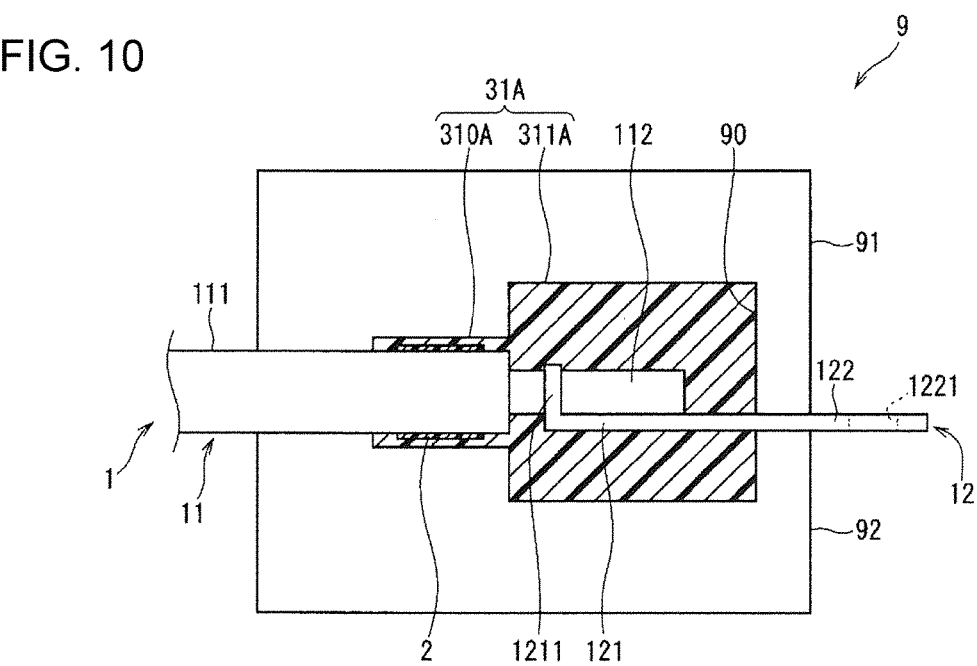
FIG. 10 is a view showing a part of the molded part-equipped electrical cable manufacturing method according to the second embodiment.
Figure 11:
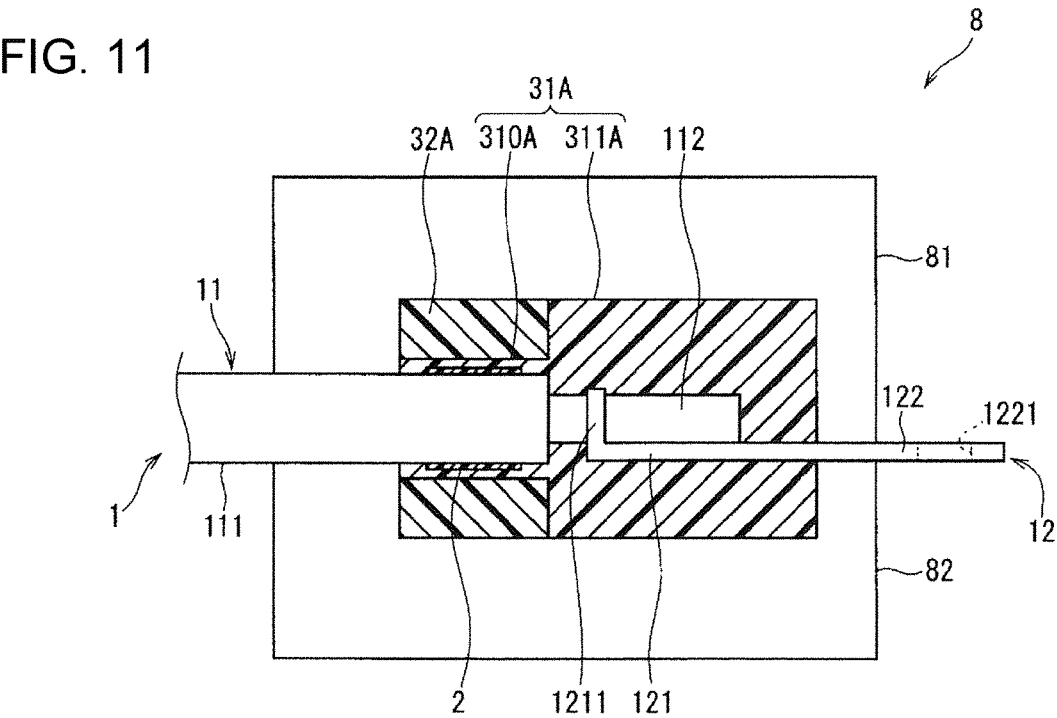
FIG. 11 is a view showing a part of the molded part-equipped electrical cable manufacturing method according to the second embodiment.

This embodiment is described, assuming that the contour shape of the molded member 3A is the same as that of the molded member 3 of the first embodiment. Accordingly, in the molded part-equipped electrical cable manufacturing method of this embodiment, a mold 8 and a mold 9 are used. The structure of the mold 8 is as in the first embodiment. The mold 9 is first described below. Note that FIG. 9 is a view showing the adhesive applying step of the molded part-equipped electrical cable manufacturing method of this embodiment. FIG. 10 is a view showing the first molded part forming step of the molded part-equipped electrical cable manufacturing method of this embodiment. FIG. 11 is a view showing the second molded part forming step of the molded part-equipped electrical cable manufacturing method of this embodiment.

In the molded part-equipped electrical cable manufacturing method of this embodiment, the mold 9 is used in the first molded part forming step. As shown in FIG. 10, the mold 9 includes an upper mold 91 and a lower mold 92. The upper and lower molds 91, 92 are movable away from and toward each other. Further, in a state where the upper and lower molds 91, 92 are closest to each other, the mold 9 is formed with a molding space 90. The molding space 90 is a space enclosed by molding surfaces having the same contour shape as the one formed by the outer peripheral surface of the first molded part 31A. Specifically, the molding space 90 includes a space having a relatively small diameter and a space having a relative large diameter, the two spaces being adjacent to each other.

In the molded part-equipped electrical cable manufacturing method of this embodiment, the adhesive applying step, the first molded part forming step, and the second molded part forming step are performed in this order. Each step of the molded part-equipped electrical cable manufacturing method is described in this order below. Further, before the start of the adhesive applying step, a terminal-equipped electrical cable manufacturing step is performed to manufacture the terminal-equipped electrical cable 1 by connecting the insulated electrical cable 11 and the terminal 12.

<Adhesive Applying Step>

In this embodiment, the adhesive applying step is performed to apply the adhesive 2 to the terminal-equipped electrical cable 1 obtained in the terminal-equipped electrical cable manufacturing step. As shown in FIG. 9, the adhesive 2 is applied over the entire circumference of the insulation coating 111 along a circumferential direction of the insulated electrical cable 11 in this embodiment. In this way, the terminal-equipped electrical cable 1 accompanied with the adhesive 2 can be obtained.

<First Molded Part Forming Step>

In this embodiment, the first molded part forming step is performed after the adhesive applying step (before the second molded part forming step) as shown in FIG. 10. The first molded part forming step is a step of forming the first molded part 31 to cover the adhesive 2 on the terminal-equipped electrical cable 1 while being in contact with the adhesive 2.

For example, the terminal-equipped electrical cable 1 accompanied with the adhesive 2 is disposed at a predetermined position of the lower mold 92 of the mold 9 and the upper mold 91 is brought closer to the lower mold 92. In the state where the upper and lower molds 91, 92 are closest to each other, a part planned to form the first molded part 31A on the terminal-equipped electrical cable 1 is accommodated in the molding space 90.

In this embodiment, the first molded part 31A covers from a part of the insulation coating 111 provided with the adhesive 2 to the connected part of the insulated electrical cable 11 and the terminal 12. Thus, the terminal-equipped electrical cable 1 is accommodated from the part of the insulation coating 111 provided with the adhesive 2 to the connected part of the insulated electrical cable 11 and the terminal 12 (part planned to form the first molded part 31A) in the molding space 90. Note that distances between the adhesive 2 and molding surfaces of the mold 9 in a part of the molding space 90 accommodating the part of the insulation coating 111 provided with the adhesive 2 are shorter than distances between the connected part of the insulated electrical cable 11 and the terminal 12 and the molding surfaces of the mold 9.

With the part of the terminal-equipped electrical cable 1 planned to form the first molded part 31A accommodated in the molding space 90 of the mold 9, molding resin for the first molded part 31A is injected into the molding space 90. The molding resin for the first molded part 31A is cured in the molding space 90 to form the first molded part 31A.

After the molding resin for the first molded part 31A is cured to form the first molded part 31, the terminal-equipped electrical cable 1 with the first molded part 31A is taken out from the mold 9. At this time, stress for peeling the adhesive 2 from the insulation coating 111 due to resin shrink is generated on the adhesive 2 provided on the surface of the insulation coating 111.

However, in this embodiment, a thickness of the first molded part 31A in contact with the adhesive 2 in the radial direction of the insulated electrical cable 11 (thickness of the thin portion 310A) is relatively small. Thus, stress for peeling the adhesive 2 from the insulation coating 111 in the radial direction of the insulated electrical cable 11 can be reduced. Therefore, it can be suppressed to form a clearance between the first molded part 31A and the insulation coating 111 of the insulated electrical cable 11 and the performance of a waterproof structure of the molded part-equipped electrical cable 200 can be improved.

<Second Molded Part Forming Step>

In this embodiment, the second molded part forming step is performed after the first molded part forming step as shown in FIG. 11. The second molded part forming step is a step performed at a time different from the first molded part forming step to form the second molded part 32A at a position contacting the first molded part 31A.

For example, the terminal-equipped electrical cable 1 accompanied with the first molded part 31A and the adhesive 2 is disposed at a predetermined position of a lower mold 82 of the mold 8 and an upper mold 81 is brought closer to the lower mold 82. In the state where the upper and lower molds 81, 82 are closest to each other, a part of the terminal-equipped electrical cable 1 planned to form the second molded part 32A and the first molded part 31A are accommodated in the molding space 80. In this embodiment, the second molded part 32A is provided outside the part of the first molded part 31A covering the adhesive 2 (thin portion 310A) in the radial direction of the insulated electrical cable 11. Thus, the part planned to form the second molded part 32A is a part outside the thin portion 310A of the first molded part 31A.

With the part of the terminal-equipped electrical cable 1 planned to form the second molded part 32A accommodated in the molding space 80 of the mold 8, molding resin for the second molded part 32A is injected into the molding space 80. When the molding resin is cured to form the second molded part 32A, the terminal-equipped electrical cable 1 accompanied with the first and second molded parts 31A, 32A is taken out from the mold 8.

Note that the first molded part 31A is formed earlier than the second molded part 32A in this embodiment. Thus, in this embodiment, the second molded part 32A is provided in contact with the first molded part 31A at the position contacting the first molded part 31A.

<Molded Part-Equipped Electrical Cable>

The molded part-equipped electrical cable 200 is obtained by taking out the terminal-equipped electrical cable 1 accompanied with the first and second molded parts 31A, 32A from the mold 8. In the molded part-equipped electrical cable 200, the boundary surface 39A indicating the boundary between the first and second molded parts 31A, 32A may be possibly formed on the molded member 3A.

In this embodiment, stress causing the peeling of the adhesive 2 due to resin shrink during the molding of the first molded part 31A can be reduced by separately molding the first and second molded parts 31A, 32A of the molded member 3A as in the first embodiment. As a result, the peeling of the adhesive 2 from the insulation coating 111 of the insulated electrical cable 11 due to resin shrink after the molding of the molded member 3A can be suppressed in the molded part-equipped electrical cable 200.

Further, in this embodiment, the second molded part 32A is present outside the part of the first molded part 31A covering the adhesive 2 in the radial direction of the insulated electrical cable 11. In this case, the molded member 3A can be molded separately in the radial direction of the insulated electrical cable 11. Thus, molding can be performed with the thickness of the first molded part 31A in the radial direction of the insulated electrical cable 11 reduced and the peeling of the adhesive 2 from the insulation coating 111 can be suppressed.

Further, the strength of the thin portion 310A of the first molded part 31A can be improved by providing the second molded part 32A outside the thin portion 310A of the first molded part 31A. Further, insulation performance in the thin portion 310A of the first molded part 31A is also improved by providing the second molded part 32A outside the thin portion 310A of the first molded part 31A.

Third Embodiment

Figure 12:
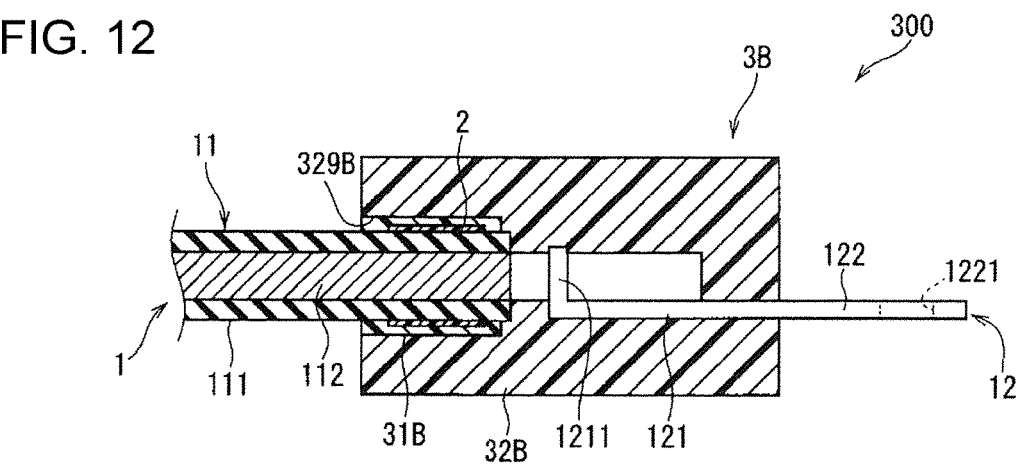
FIG. 12 is a side view partly in section of a molded part-equipped electrical cable according to a third embodiment.

Next, a molded part-equipped electrical cable 300 according to a third embodiment is described with reference to FIG. 12. The molded part-equipped electrical cable 300 includes a molded member 3B structured differently from the molded member 3 of the molded part-equipped electrical cable 100 and the molded member 3A of the molded part-equipped electrical cable 200. The molded member 3B includes a first molded part 31B and a second molded part 32B. FIG. 12 is a side view partly in section of the molded part-equipped electrical cable 300. Note that, in FIG. 12, the same constituent elements as those shown in FIGS. 1 to 11 are denoted by the same reference signs.

This embodiment differs from the first embodiment in that the second molded part 32B is present outside a part of the first molded part 31B covering an adhesive 2 in a radial direction of an insulated electrical cable 11. Further, this embodiment differs from the second embodiment in that the second molded part 32B covers a connected part of the insulated electrical cable 11 and a terminal 12. Specifically, in this embodiment, the second molded part 32B is present on the terminal 12 side of the first molded part 31B covering the adhesive 2 in a longitudinal direction of the insulated electrical cable 11 and outside the part of the first molded part 31B covering the adhesive 2 in the longitudinal direction of the insulated electrical cable 11. Points of difference of this embodiment from the first and second embodiments are described below The first molded part 31B is formed into an annular shape covering the periphery of the adhesive 2. A thickness of the first molded part 31B is thought to be, for example, 1 mm to 2 mm.

The second molded part 32B includes an annular part provided outside a part of the first molded part 31B covering the adhesive 2 (entire first molded part 31B) in the radial direction of the insulated electrical cable 11 and an annular part covering the periphery of the connected part of the insulated electrical cable 11 and the terminal 12. Thus, the second molded part 32B may be possibly formed with a recess 329B corresponding to the contour shape of the first molded part 31B. In the molded member 3B, the first molded part 31B is accommodated in the recess 320B.

Further, also in this embodiment, the molded member 3B may be possibly formed with a boundary surface indicating a boundary between the first and second molded parts 31B, 32B. In this embodiment, this boundary surface is thought to be a boundary surface extending along the contour of the first molded part 31B formed on a rear end side of the molded member 3B.

Since the first and second molded parts 31B, 32B of the molded member 3B are separately molded also in this embodiment, stress causing the peeling of the adhesive due to resin shrink during the molding of the first molded part 31B can be reduced.

Further, in this embodiment, the second molded part 32B is present on the terminal 12 side of the first molded part 31B covering the adhesive 2 in the longitudinal direction of the insulated electrical cable 11 and outside the part of the first molded part 31B covering the adhesive 2 also in the radial direction of the insulated electrical cable 11. In this case, the molded member 3B can be molded separately in the longitudinal direction and radial direction of the insulated electrical cable 11. Thus, molding can be performed with thicknesses of the first molded part 31B in the longitudinal direction and radial direction of the insulated electrical cable reduced. In this way, stress causing the peeling of the adhesive 2 due to resin shrink during the molding of the first molded part 31B can be reduced and the peeling of the adhesive 2 from the insulation coating 111 can be suppressed.

Application Example

The molded member 3 may possibly include the first molded part 31 and a plurality of types of second molded parts 32. Specifically, the molded member 3 may possibly include three or more molded parts formed by molding separately performed over three or more times. The same applies also to the molded members 3A, 3B.

Note that the molded part-equipped electrical cable and the molded part-equipped electrical cable manufacturing method according to the present invention can be configured by freely combining the respective embodiments and application example described above or appropriately modifying or partially omitting the respective embodiments and application example within the scope of the invention as claimed.

LIST OF REFERENCE SIGNS 1 terminal-equipped electrical cable
100 molded part-equipped electrical cable
11 insulated electrical cable
111 insulation coating
112 core
12 terminal
2 adhesive
3 molded member
31 first molded part
32 second molded part

The invention claimed is:

1. A molded part-equipped electrical cable, comprising:
a terminal-equipped electrical cable including an insulated electrical cable having a core and an insulation coating covering the periphery of the core and a terminal connected to an end part of the insulated electrical cable;
an adhesive provided on a surface of the insulation coating of the terminal-equipped electrical cable; and
a molded member covering from a part provided with the adhesive on the insulation coating of the terminal-equipped electrical cable to a connected part of the insulated electrical cable and the terminal,
wherein:
the molded member includes a first molded part and a second molded part separately molded;
the first molded part includes a part entirely covering the adhesive while being in contact with the adhesive;
the second molded part is present on the terminal side of the first molded part covering the adhesive in a longitudinal direction of the terminal-equipped electrical cable; and
the first molded part includes no part covering the terminal and the second molded part includes no part covering the insulation coating.

2. A molded part-equipped electrical cable manufacturing method for manufacturing the molded part-equipped electrical cable of claim 1, comprising:
(a) a step of forming the first molded part to cover the adhesive of the terminal-equipped electrical cable while being in contact with the adhesive; and
(b) a step of forming the second molded part at a position contacting the first molded part, the step (b) being performed at a time different from the step (a),
wherein the first and second molded parts form the molded member covering from the part provided with the adhesive on the insulation coating of the terminal-equipped electrical cable to the connected part of the insulated electrical cable and the terminal.

3. The molded part-equipped electrical cable of claim 1, wherein the insulation coating is made of silicone rubber.

4. The molded part-equipped electrical cable of claim 1, wherein the first and second molded parts are formed of the same molding resin.

5. A molded part-equipped electrical cable, comprising:
a terminal-equipped electrical cable including an insulated electrical cable having a core and an insulation coating covering the periphery of the core and a terminal connected to an end part of the insulated electrical cable;
an adhesive provided on a surface of the insulation coating of the terminal-equipped electrical cable; and
a molded member covering from a part provided with the adhesive on the insulation coating of the terminal-equipped electrical cable to a connected part of the insulated electrical cable and the terminal,
wherein:
the molded member includes a first molded part and a second molded part separately molded;

the first molded part includes a part covering the adhesive while being in contact with the adhesive;

the second molded part is present outside the part of the first molded part covering the adhesive in a radial direction of the terminal-equipped electrical cable; and the second molded part includes no part directly covering and contacting the adhesive and the insulation coating of the electrical cable.

6. The molded part-equipped electrical cable of claim 5, wherein the insulation coating is made of silicone rubber.

7. The molded part-equipped electrical cable of claim 6, wherein the first and second molded parts are formed of the same molding resin.

* * * * *